(12) United States Patent
Madan et al.

(10) Patent No.: US 9,779,373 B1
(45) Date of Patent: Oct. 3, 2017

(54) ITEM FLOW VISUALIZATION FOR OUTBOUND FULFILLMENT

(71) Applicant: Amazon Technologies, Inc., Reno, NV (US)

(72) Inventors: Udit Madan, Seattle, WA (US); David Daniel Glick, Seattle, WA (US); Lubos Bosak, Everett, WA (US); Nathan Ryan Bosch, Burien, WA (US); Robert Dreaper McDonald, Jr., Seattle, WA (US); Hao He, Seattle, WA (US); Steven Michael Hood, Bothell, WA (US); Michael Ellsworth Bundy, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 901 days.

(21) Appl. No.: 14/092,225

(22) Filed: Nov. 27, 2013

(51) Int. Cl.
*G06Q 10/00* (2012.01)
*G06Q 10/06* (2012.01)
*G06Q 30/06* (2012.01)

(52) U.S. Cl.
CPC . *G06Q 10/063114* (2013.01); *G06Q 30/0635* (2013.01)

(58) Field of Classification Search
None
See application file for complete search history.

(56) References Cited

U.S. PATENT DOCUMENTS

| | | | |
|---|---|---|---|
| 7,835,951 B1* | 11/2010 | Burger | G06Q 10/087 705/28 |
| 2007/0078725 A1* | 4/2007 | Koszewski | G06Q 30/0271 705/14.67 |
| 2011/0125609 A1* | 5/2011 | Burger | G06Q 10/087 705/27.1 |
| 2012/0089486 A1* | 4/2012 | Mahakian | G06Q 30/0635 705/26.81 |
| 2013/0197976 A1* | 8/2013 | Mahakian | G06Q 10/08 705/7.38 |
| 2014/0095248 A1* | 4/2014 | Duvaragamani | G06Q 10/06315 705/7.25 |

* cited by examiner

*Primary Examiner* — Gurkanwaljit Singh
(74) *Attorney, Agent, or Firm* — Thomas | Horstemeyer, LLP (57) ABSTRACT

Disclosed are various implementations for generating one or more visualization regions in a user interface indicative of a state of a fulfillment center. A visualization region may be generated comprising one or more visual identifiers, labels, and metrics describing one or more stages in a fulfillment process. In response to a manipulation of a portion of the visualization region, a predefined action may be initiated.

20 Claims, 7 Drawing Sheets

ITEM FLOW VISUALIZATION FOR OUTBOUND FULFILLMENT

BACKGROUND

Merchants participating in a marketplace facilitated by an electronic commerce site may employ a fulfillment network associated with the electronic commerce site to fulfill orders by users in the marketplace. To this end, merchants may send shipments containing items to one or more fulfillment centers in a fulfillment network. The fulfillment centers may then store the items and fulfill customer orders for the items on behalf of the merchants. Fulfilling customer orders in a timely and cost efficient manner is a primary objective of the fulfillment centers. Quickly determining a state for various stages of a fulfillment center respective to a number of customer orders being fulfilled remains problematic.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to generating one or more visualization regions in a user interface indicative of a state of a fulfillment center. Merchants participating in a marketplace facilitated by an electronic commerce site may employ a fulfillment network associated with the electronic commerce site to fulfill orders by users in the marketplace. To this end, merchants may send shipments containing items to one or more fulfillment centers in a fulfillment network. The fulfillment centers may then store the items and fulfill customer orders for the items on behalf of the merchants. Fulfilling customer orders in a timely and cost efficient manner is a primary objective of the fulfillment centers. Quickly determining a state for various stages of a fulfillment center respective to a number of customer orders being fulfilled remains problematic.

For example, in fulfilling a customer order, a fulfillment center may quantify the performance of the fulfillment center by determining metrics for a number of stages that make up a fulfillment process. A fulfillment process may comprise, for example, the manner in which items purchased by a user over an electronic commerce system are pulled from an inventory storage location, such as a warehouse, and shipped to the shipping address specified by a user conducting the purchase. Metrics for each stage of the fulfillment process may provide a manager or other personnel with data that may be beneficial in adjusting the conditions of the fulfillment center. Hence, metrics may be used by personnel of the fulfillment center in avoiding or lessening overflow and underflow conditions that are undesirable in respective stages of the fulfillment process. For example, in an overflow condition, there is an excessive build-up of work, leading to untimely delays in fulfillment of a customer order. In contrast, in an underflow condition, resources are idled waiting for work. By quickly determining a state for particular stages in a fulfillment center, a manager or other personnel may avoid and/or remedy overflow conditions and underflow conditions by shifting personnel, adding personnel, enlarging work buffers, etc.

A more detailed example of a fulfillment center will next be described, followed by an overview of example processes within the fulfillment center. Although the examples set forth herein primarily relate to fulfillment centers, it is understood that the principles of the present disclosure may be applicable to processing in other materials handling facilities, assembly lines in manufacturing facilities, demanufacturing in recycling facilities, and/or any pipelined work process.

As a non-limiting example, outbound processing of a fulfillment center may begin in a "pick area" where agents in the pick area are instructed to pick items from storage locations in the inventory area. To this end, the agents may retrieve totes and/or other containers and carts from a staging area. The agents may then be presented with an efficient pick route through the inventory area to pick a list of specific items for one or more customer orders. Upon arriving at a storage location, an agent may retrieve an item from a bin, slot, shelf, etc., and then scan an identifier of the item to verify that the item has been picked. The agent then places the item in a particular tote. Upon returning to the pick area, the agent places the totes in the staging area. Reviewing data related to a fulfillment process remains a manual process and may require sifting through a vast amount of data. As may be appreciated, the stages in completing the outbound processing of the fulfillment center may be quantified and metrics may be generated for each of the stages. However, analyzing the metrics respective of the stages of the fulfillment process may remain burdensome.

Accordingly, various implementations of the present disclosure generate a visualization region indicative of a state of one or more fulfillment centers. For example, stages in a fulfillment process for a respective fulfillment center may be identified and one or more metrics for each of the stages of the fulfillment process may be generated. Visual identifiers comprising graphics, labels, and/or metrics may be used in the generation of a visualization region in a user interface, wherein the visualization region provides a manager or other fulfillment center personnel with a manner of quickly determining a state of one or more stages of the fulfillment process, thereby avoiding unnecessary underflow and overflow conditions by shifting personnel, adding personnel, enlarging work buffers, etc. In the following discussion, a general description of the system and its components is provided, followed by a discussion of the operation of the same.

Figure 1A:
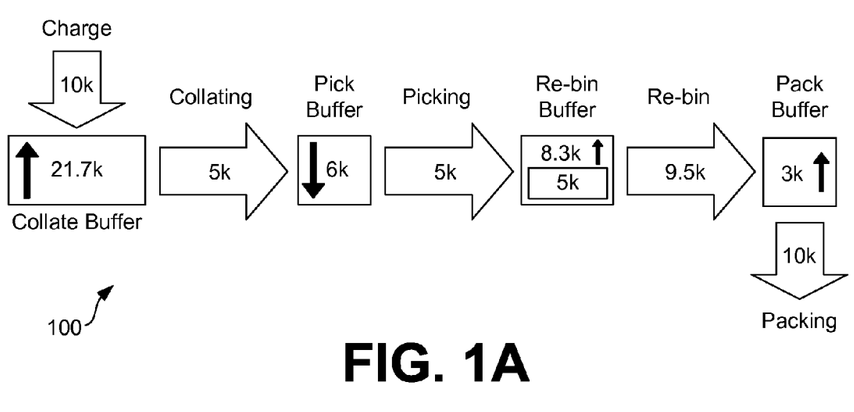
FIG. 1A is a drawing of an example visualization region according to various implementations of the present disclosure.

With reference to FIG. 1A, shown is a drawing of an example visualization region 100 according to various implementations of the present disclosure. A visualization region 100 may comprise a graphical representation of one or more stages in a fulfillment process for a respective fulfillment center. For individual ones of the stages in the fulfillment process, metrics may be identified or generated and may be depicted in association with a corresponding stage of the fulfillment process, as will be discussed in greater detail below.

As may be appreciated, a portion of the stages in a fulfillment process for a respective fulfillment center may comprise, for example, stages for charging the customer for an order and/or assigning the order to a respective fulfillment center (i.e., "Charge"); collating orders (i.e., "Collating"); picking items from inventory locations (i.e., "Picking"), placing the items in particular bins corresponding to an order (i.e., "Re-bin"), and packing the items for shipment (i.e., "Packing"). Similarly, "buffers" may be employed to represent the items waiting to be processed in a subsequent stage. Exemplary buffers may comprise, for example, a buffer for items awaiting collation (i.e., "Collate Buffer"); items awaiting a pick-up during the picking stage (i.e., "Picking Buffer"); items awaiting to be placed in a bin corresponding to the order (i.e., "Re-bin Buffer"); and items awaiting to be packed in a package for shipping (i.e., "Pack Buffer").

Accordingly, the visualization region 100 may be beneficial in quickly identifying a state of a fulfillment center by facilitating a presentation of data generated by the fulfillment center. To alleviate or avoid underflow and overflow conditions, personnel of the center may be shifted, added, removed, etc., from particular stages of the fulfillment process. Similarly, buffers may be sized or resized to hold output of previous stages of the fulfillment process and to provide input to subsequent stages to avoid overflow and underflow, respectively. Various techniques relevant to determining a capacity of a buffer in a stage of a fulfillment process are disclosed in U.S. patent application Ser. No. 14/031,890 entitled "DETERMINING CAPACITIES OF WORK BUFFERS" and filed on Sep. 19, 2013, which is incorporated herein by reference in its entirety.

Figure 1B:
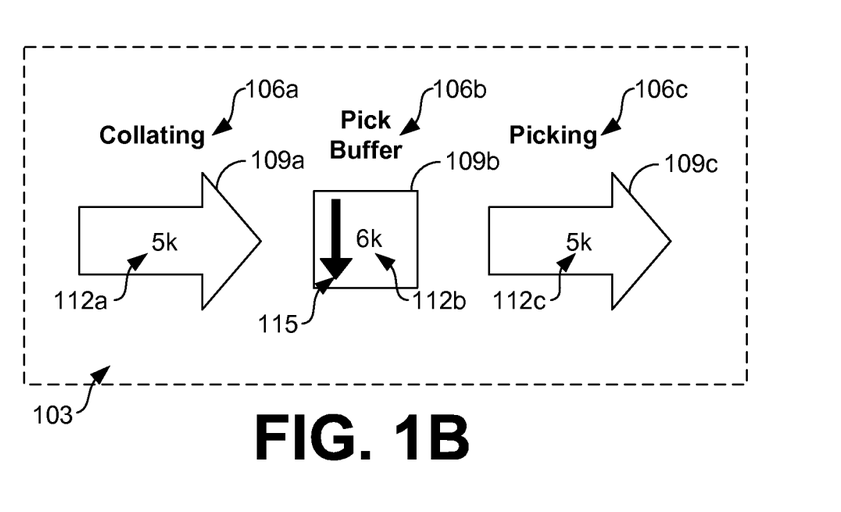
FIG. 1B is a drawing of a portion of the example visualization region of FIG. 1A according to various implementations of the present disclosure.

Moving on to FIG. 1B, shown is a drawing of a portion 103 of the example visualization region 100 of FIG. 1A according to various implementations of the present disclosure. In the non-limiting example of FIG. 1B, a portion 103 of a visualization region 100 (FIG. 1A) may comprise, for example, labels 106a, 106b, and 106c. In addition, the portion 103 of the visualization region 100 may comprise visual identifiers 109a, 109b, and 109c as well as metrics 112a, 112b, and 112c. As may be appreciated, a label 106 may comprise, for example, a descriptive tag that identifies a corresponding stage of the fulfillment process. A visual identifier 109 may comprise a shape or object of a varying size, shape, or color that may identify a corresponding stage of the fulfillment process. In the non-limiting example of FIG. 1B, a visual identifier 109 may comprise, for example, an arrow representing an active step that identifies the progression of the stages of the fulfillment process and a square for a passive step for items awaiting processing. However, visual identifiers 109 may further comprise other shapes of varying colors and sizes to represent a corresponding stage of the fulfillment process.

As a non-limiting example, a metric 112 may comprise the number of items classified in a corresponding stage of the fulfillment process, a number of workers assisting in the corresponding stage of the fulfillment process, a percentage of labor assisting in the corresponding stage of the fulfillment process, a staffing level, and/or any other quantifiable measure of a processing state. As may be appreciated, metrics 112 may be generated for a predefined temporal range. For example, metrics 112 may be generated for each stage of the fulfillment process for a period of time between a predefined start time and a predefined end time, thus may be subject to change over different temporal ranges.

To this end, a change component 115 may be used to illustrate whether the metrics 112 depicted in a corresponding stage of the fulfillment process have increased or decreased relative to a previously generated metric 112 for the same stage of the fulfillment process. In the non-limiting example of FIG. 1B, a change component 115 may comprise a down arrow employed to illustrate that the metric 112b corresponding to the Pick Buffer has decreased from a previously generated metric 112 corresponding to the same Pick Buffer. In various implementations, the change component 115 may be used to illustrate an increase or a decrease of the metrics 112 depicted in a corresponding stage of the fulfillment process meeting a predefined threshold. For example, the change component 115 may be used to illustrate that a certain volume of items has increased or decreased at a respective stage of the fulfillment process.

Similarly, the change component 115 may be used to illustrate a rate of change (i.e., a second order derivative) of the metrics 112 depicted in a corresponding stage of the fulfillment process meeting a predefined threshold. For example, the change component 115 may be employed to illustrate that a corresponding stage of the fulfillment process has an increasing number of items accelerating beyond a predefined rate of acceleration. According to various embodiments, the arrow (or other shape) illustrating a rate of change of the metrics 112 depicted in a corresponding stage of the fulfillment process may vary in size according to the rate of change of the metrics 112. For example, the arrow may increase in size as the rate of change increases. Similarly, the arrow may decrease in size as the rate of change decreases. In alternative embodiments, the color arrow may change according to the rate of change.

Although the visualization region 100 of FIG. 1A and the portion 103 of the visualization region 100 of FIG. 1B describe an outbound process, the disclosure is not so limited. It is understood that the principles of the visualization region 100 may be applicable to inbound processing as well as processing in other materials handling facilities, assembly lines in manufacturing facilities, demanufacturing in recycling facilities, and/or any pipelined work process.

Figure 2:
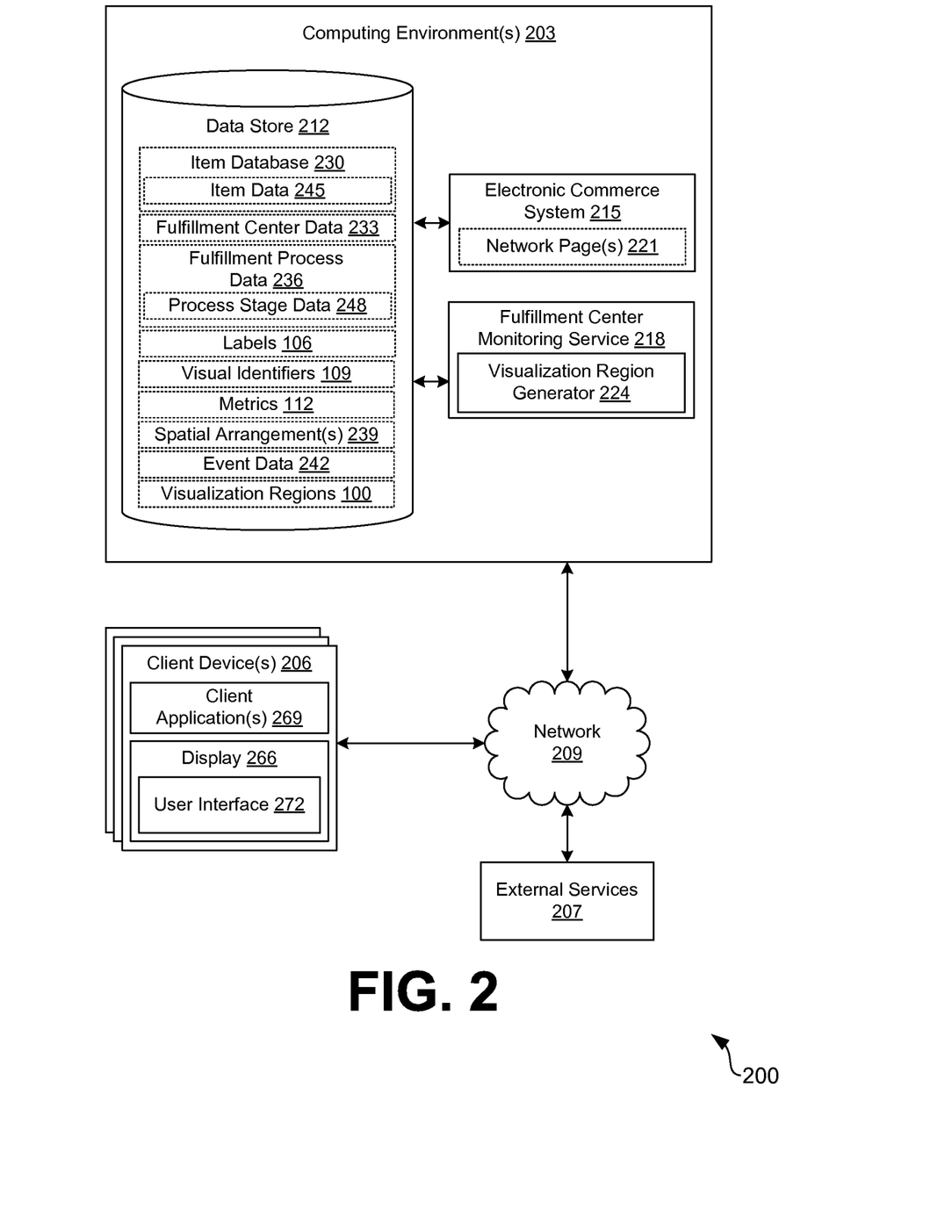
FIG. 2 is a drawing of a networked environment according to various implementations of the present disclosure.

With reference to FIG. 2, shown is a networked environment 200 according to various implementations. The networked environment 200 includes a computing environment 203, a client device 206, and external services 207, which are in data communication with each other via a network 209. The network 209 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various implementations. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include an electronic commerce system 215, a fulfillment center monitoring service 218, and other applications, services, processes, systems, engines, or functionality not discussed in detail herein. The electronic commerce system 215 is executed in order to facilitate the online purchase of items over the network 209. The electronic commerce system 215 also performs various backend functions associated with the online presence of a merchant in order to facilitate the online purchase of items as will be described. For example, the electronic commerce system 215 generates user interfaces such as network pages 221, web pages, or other types of network content that are provided to client devices 206 for the purposes of selecting items for purchase, rental, download, lease, or other form of consumption.

The fulfillment center monitoring service 218 is executed to monitor the inbound and outbound processing of items in a fulfillment center. Inbound processing may comprise, for example, receiving items from a merchant seller for storage and fulfillment when users of the electronic commerce system 215 generate orders. Outbound processing may comprise, for example, pulling items from an inventory storage location, such as a warehouse, packaging the items, and shipping the items to the shipping address specified by a user. Further, the fulfillment center monitoring service 218 may employ a visualization region generator 224 to generate one or more visualization regions 100 that may be encoded in one or more user interfaces, as will be discussed in greater detail below. According to various implementations, the fulfillment center monitoring service 218 may be executed independent of the electronic commerce system 215 as fulfillment centers may fulfill orders initiated independent of an electronic marketplace, such as phone orders, mail orders, etc. According to various embodiments, the fulfillment center monitoring service 218 may communicate with external services 207 to set or otherwise modify thresholds mentioned throughout the present disclosure. In addition, the fulfillment center monitoring service 218 may communicate with external services 207 to receive or update data used to generate the visualization region 100, as will be described in greater detail below.

The data stored in the data store 212 includes, for example, an item database 230, fulfillment center data 233, fulfillment process data 236, labels 106, visual identifiers 109, metrics 112, spatial arrangements 239, event data 242, visualization regions 100, and potentially other data. An item database 230 includes item data 245 that represent the items that, for example, may be available for purchase, rent, lease, trade, etc., through the electronic commerce system 215. An item may comprise, for example, a product, good, or package that may be made available for consumption in a marketplace. Hence, the item data 245 may comprise, for example, a description of an item, an image of an item, a serial number used in tracking the item, a current stage of the fulfillment process, and/or any other type of information that may be of interest to a customer when deciding whether to purchase, rent, lease, trade, etc. Similarly, the item data 233 may be used in the fulfillment of an order in a fulfillment center.

Fulfillment center data 233 may describe inbound and outbound work related to the fulfillment and shipment of items at a fulfillment center for a time period, e.g., the past week, the past year, etc. The fulfillment center data 233 may be obtained, for example, from the fulfillment center monitoring service 218, the client device 206, or from another source. Fulfillment process data 236 may comprise data related to the manner in which items purchased by a user over the electronic commerce system 215 are pulled from an inventory storage location in the fulfillment center and shipped to the shipping address specified by a user conducting the purchase. Fulfillment process data 236 includes process stage data 248 related to quantifiable stages in the fulfillment process. According to various implementations, fulfillment process data 236 may correspond to a particular fulfillment center, wherein the process of pulling items from an inventory storage location and shipping to a shipping address may be unique to the particular fulfillment center.

The data store 212 includes labels 106, visual identifiers 109, and metrics 112. As described above with respect to FIG. 1A, a label 106 may comprise, for example, a descriptive tag that identifies a stage of the fulfillment process. A visual identifier 109 may comprise a shape or object of a varying size, shape, or color that may identify a stage of the fulfillment process.

Metrics 112 may include, for example, numbers, percentages, or other indicators that are indicative of a state of the fulfillment process. For example, metrics 112 may comprise the number of items classified in a corresponding stage of the fulfillment process, a number of workers assisting in the corresponding stage of the fulfillment process, a percentage of labor assisting in the corresponding stage of the fulfillment process, a staffing level, and/or any other quantifiable measure of a processing state. As may be appreciated, metrics 112 may be generated for a predefined temporal range. For example, metrics 112 may be generated for each stage of the fulfillment process for a period of time between a predefined start time and a predefined end time, thus may be subject to change over different temporal ranges.

A spatial arrangement 239 may comprise, for example, the size and/or position of the plurality of the labels 106, the visual identifiers 109, and/or the metrics 112, the size of the visualization region 100, and/or any other data used in generating an appearance of the visualization region 100. Event data 242 is associated with events predefined by an administrator of the fulfillment center monitoring service 218 that, when detected, may initiate an action upon detection of a predefined event. As a non-limiting example, an event may comprise a manipulation of at least a portion of the visualization region 100 by a viewer of a user interface 272 in which the visualization region 100 is encoded. When a user manipulates the portion of the visualization region 100, the visualization region generator 224 may initiate a predefined action such as presenting the user with additional information related to the manipulated portion of the visualization region 100, as will be discussed in greater detail below. A visualization region 100 includes a graphical representation representative of one or more stages in a fulfillment process for a respective fulfillment center. The visualization region 100 may be generated and/or updated by the visualization region generator 224 and stored in the data store 212.

The client device 206 is representative of a plurality of client devices that may be coupled to the network 209. The client device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 206 may include a display 266. The display 266 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 206 may be configured to execute various applications such as a client application 269 and/or other applications. The client application 269 may be executed in a client device 206, for example, to access network content served up by the computing environment 203 and/or other servers, thereby rendering a user interface 272 on the display 266. To this end, the client application 269 may comprise, for example, a browser, a dedicated application, etc., and the user interface 272 may comprise a network page, an application screen, etc. According to various implementations, the client application 269 may be configured to generate a visualization region 100 on the client device 206, for example, according to data provided by the visualization region generator 224 over the network. The client device 206 may be configured to execute applications beyond the client application 269 such as, for example, email applications, social networking applications, word processors, spreadsheets, and/or other applications.

The external services 207 may comprise, for example, services that may monitor the state of a fulfillment process. The fulfillment center monitoring service 218 may poll the external service 207 at predefined frequencies to obtain data related to the state of a fulfillment center. The external services 207, however, may be configured to send push notifications to the fulfillment center monitoring service 218 at, for example, predefined frequencies.

Next, a general description of the operation of the various components of the networked environment 200 is provided. To begin, it is understood that various customers of an electronic marketplace are purchasing or leasing items from the item database 230 via the electronic commerce system 215. The merchant sellers in the electronic marketplace may send shipments containing items to one or more fulfillment centers in a fulfillment network. The fulfillment centers may then store the items and fulfill customer orders for the items on behalf of the merchants. Alternatively, fulfillment centers may fulfill customer orders independent of the merchant sellers, for example, where fulfillment center is operated by an exclusive seller. Fulfillment centers may also fulfill items purchased by email, mail, phone, etc. Fulfilling customer orders in a timely and cost efficient manner is a primary objective of the personnel working in the fulfillment centers.

Accordingly, it may be assumed that a user (e.g., an agent working in a fulfillment center) has initiated a request for a visualization region 100 for a respective one or more fulfillment centers. In various implementations, the fulfillment center monitoring service 218 may be configured to monitor or obtain data from one or more fulfillment centers by obtaining data from the external services 207. For example, agents in a fulfillment center may retrieve totes and/or other containers and carts from various staging areas located throughout the fulfillment center. When an agent interacts with an item, the agent may scan the item using a scanning device, such as a barcode scanner, which may provide a location of the item respective to its stage in the fulfillment process. For example, upon arriving at a storage location, an agent may retrieve an item from a bin, slot, shelf, etc., and then scan an identifier of the item to verify that the item has been picked. Accordingly, the fulfillment center may generate data that may be used in determining metrics 112 relative to a particular stage in the fulfillment process. A user interface 272 may be generated by the fulfillment center monitoring service 218 or by the client application 269 that enables the user to access visualization regions 100 corresponding to a respective fulfillment center.

The visualization region generator 224 may identify a plurality of stages in a fulfillment process respective of the fulfillment center initiated in the request. As discussed above, a fulfillment process may comprise, for example, the manner in which items purchased over an electronic commerce system 215 are pulled from an inventory storage location, such as a bin in a warehouse, and shipped to the shipping address specified by a user conducting the purchase. The stages of the fulfillment process may comprise, for example, quantifiable tasks in the fulfillment process. According to various implementations, a fulfillment process may correspond to a particular fulfillment center, wherein the process of pulling items from an inventory storage location and shipping to a shipping address may be unique to the particular fulfillment center.

The visualization region generator 224 may subsequently identify a plurality of labels 106 for individual stages of the fulfillment process. A label 106 may comprise, for example, an audio or visual representation (e.g., sound, text, image) describing a stage that may make the corresponding stage readily familiar to a viewer of the visualization region 100. The visualization region generator 224 may then determine one or more metrics 112 for individual ones of the plurality of stages of the fulfillment process. As discussed above, a metric 112 may comprise, for example, a number, percentage, and/or any other representation that may represent a measure of a processing state at a particular stage of the fulfillment process. As a non-limiting example, a metric 112 may comprise the number of items classified in a corresponding stage of the fulfillment process, a number of workers assisting in the corresponding stage of the fulfillment process, a percentage of labor assisting in the corresponding stage of the fulfillment process, a staffing level, and/or any other quantifiable measure of a processing state.

The visualization region generator 224 may further access or dynamically generate a plurality of visual identifiers 109, wherein visual identifiers 109 may be used to represent a particular stage in the fulfillment process. According to one implementation, the plurality of visual identifiers 109 may be accessed from the data store 212 or any other memory. For example, a visual identifier 109 may comprise an image of a shape such as a rectangle, square, octagon, triangle, or any other shape that may vary according to size and/or color. The image may be accessed from the data store 212 and used in representing a particular stage in the fulfillment process.

According to another implementation, the plurality of visual identifiers 109 may be generated dynamically upon receipt of the request to generate a visualization region 100. For example, a visual identifier 109 may be generated using Adobe® Flash, JavaScript (JS), Open Graphics Library (OpenGL), Microsoft® DirectX, and/or any other graphics generation resource that may generate a graphic or other visual representation for a particular stage in the fulfillment process. For example, a dynamically generated visual identifier 109 may comprise an image of a shape such as a rectangle, square, octagon, triangle, or any other shape that may vary according to a predefined size and/or color. The image may be stored in the data store 212 and/or used in representing a particular stage in the fulfillment process.

The visualization region generator 224 may then determine a spatial arrangement 239 for the plurality of labels 106, visual identifiers 109, and metrics 112, wherein respective visual identifiers 109 correspond to at least one of the plurality of stages. A spatial arrangement 239 may comprise, for example, the size and/or position of the labels 106, the visual identifiers 109, and/or the metrics 112, the size of the visualization region 100, and/or any other data used in generating an appearance of the visualization region 100.

The visualization region generator 224 subsequently generates the visualization region 100, for example, according to the determined spatial arrangement 239. According to various implementations, the visualization region generator 224 may employ HyperText Markup Language (HTML), Cascading Style Sheets (CSS), Adobe® Flash, JS, OpenGL, Microsoft® DirectX, and/or any other visual generation resource to generate the visualization region 100.

The visualization region generator 224 may send or otherwise communicate the visualization region 100 to the fulfillment center monitoring service 218 to be encoded in a user interface 272, although in some implementations, the visualization region generator 224 may be configured to independently encode the visualization region 100 in the user interface 272, such as a network page 221. Alternatively, the visualization region generator 224 may send data to the client application 269 that may generate the visualization region 100 on the client device 100 according to the data provided by the visualization region generator 224.

According to various implementations, the visualization region 100 may be encoded as a static region of a user interface 272. In other implementations, the visualization region 100 may be encoded as a dynamic region of a user interface 272, capable of updating, refreshing, or otherwise changing upon an occurrence of an event. As a non-limiting example, an event may comprise a manipulation of at least a portion of the visualization region 100 by a viewer of the user interface 272. When a user manipulates the portion of the visualization region 100, the visualization region generator 224 may initiate a predefined action.

In another example, an event may comprise a push or poll of data indicating that a metric 112 represented in the visualization region 100, or data used in generating the metric 112, has changed. For example, the fulfillment center monitoring service 218 may monitor the state of a fulfillment process by polling one or more services at predefined frequencies. Similarly, the one or more services may send push notifications to the fulfillment center monitoring service 218, for example, at predefined frequencies or upon a change of the data used in generating the metrics 112.

Accordingly, if it is determined whether an event has occurred, the visualization region generator 224 may initiate a predefined action respective to the event.

Figure 3A:
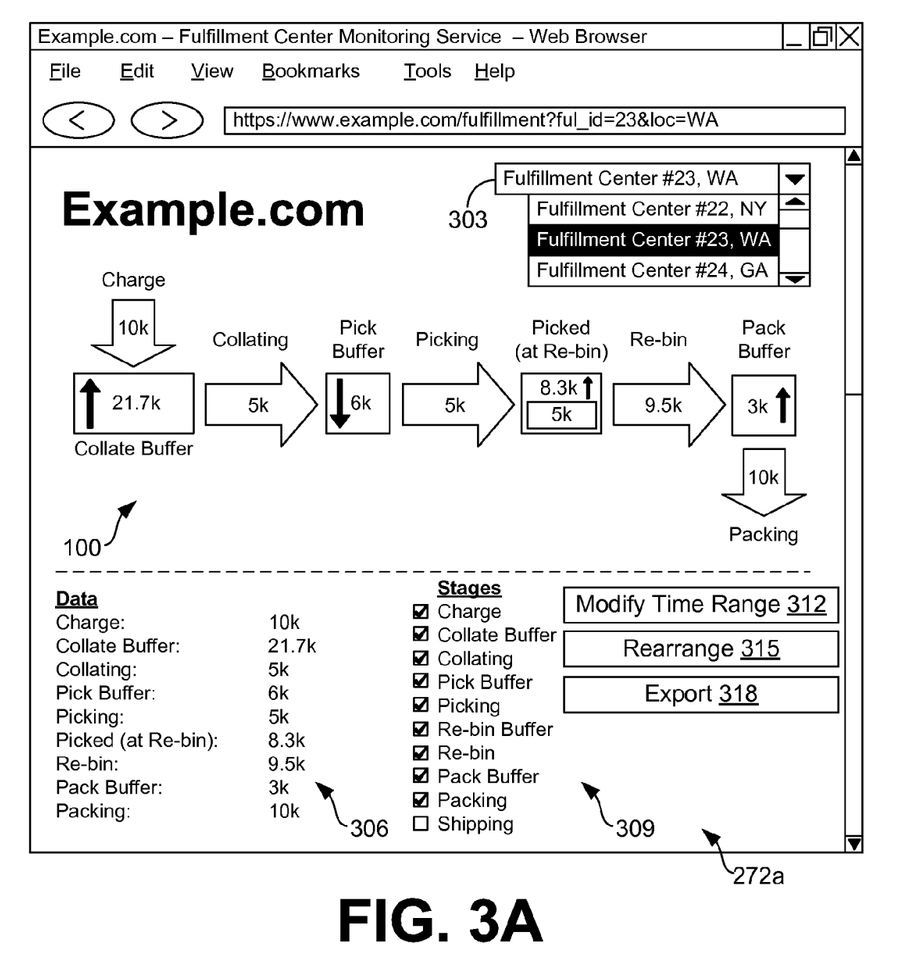
FIG. 3A is a drawing of an example user interface rendered by a client device in the networked environment of FIG. 2 according to various implementations of the present disclosure.

Referring next to FIG. 3A, shown is a drawing of an example user interface 272a capable of being rendered by a client device 206 (FIG. 2) in the networked environment 200 of FIG. 2 according to various implementations of the present disclosure. In the non-limiting example of FIG. 3A, a visualization region 100 may be encoded in a network page 221, such as a web page, accessible over a network 200. As may be appreciated, the visualization region 100 may be beneficial in visualizing the state of particular stages in a fulfillment process.

A fulfillment center selection component 303 may be manipulated by a viewer of the user interface 272 to initiate a request for a visualization region 100 for a respective fulfillment center. For example, by manipulating the fulfillment center selection component 303, a viewer may select a particular fulfillment center (i.e., "Fulfillment Center #23, WA"). In response, a subsequent user interface 272 may be rendered comprising at least one visualization region 100 generated respective of the selected fulfillment center.

The user interface 272 may further comprise a data component 306 that provides the metrics 112 depicted in the visualization region 100 in a text-based format. According to various implementations, the visualization region 100 may be customizable by a viewer of the user interface 272. For example, the viewer may manipulate one or more selection components 309 to configure or filter specific stages of the fulfillment process depicted in the visualization region 100. As may be appreciated, a manipulation of one of the selection components 309 may toggle between the addition and removal of the corresponding stage from the visualization region 100.

Figure 3B:
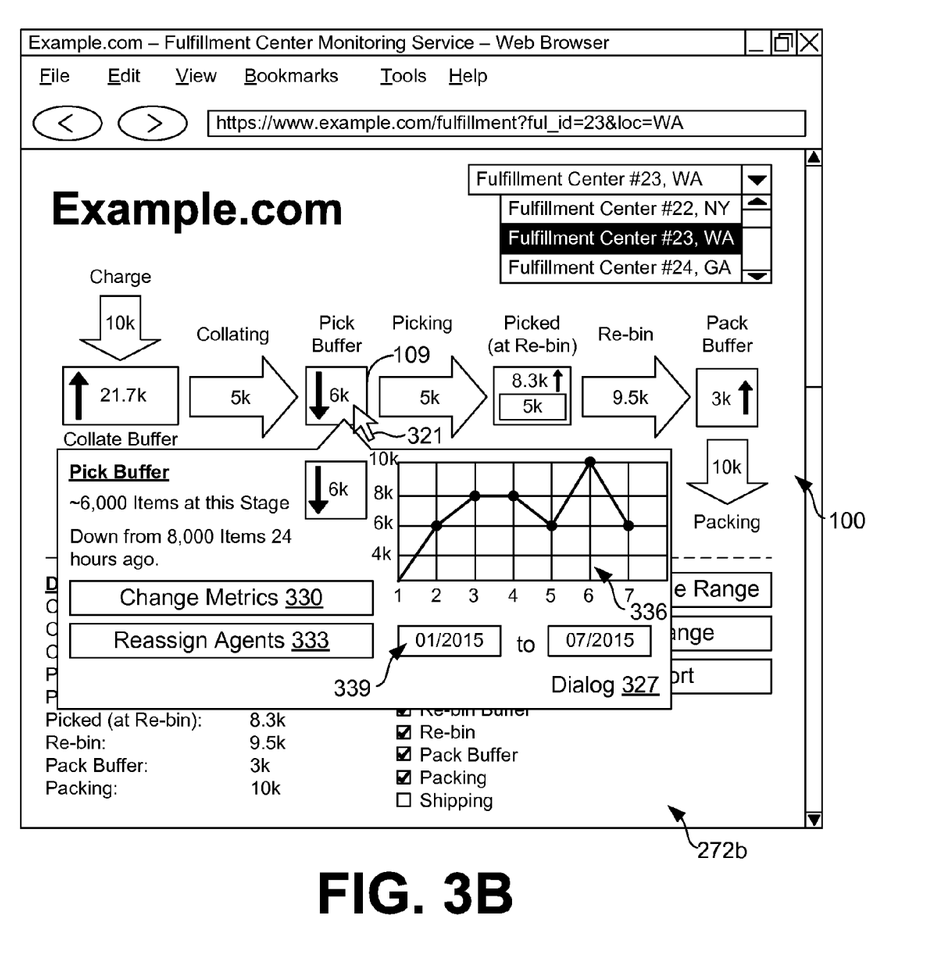
FIG. 3B is a drawing of another example user interface rendered by the client device in the networked environment of FIG. 2 according to various implementations of the present disclosure.

Although the selection component 309 of FIG. 3B depicts various stages in a fulfillment process, other actions respective of a fulfillment center or the fulfillment may be shown and used in the filtering employed in the generation of the visualization region 100. For example, the visualization region 100 may embody other properties, such as distinct process paths for particular items in the fulfillment process, distinct actions taken in the fulfillment of the particular items, which delivery vehicles particular items may be placed on, the time the particular items are due at a delivery vehicle, and/or any other properties associated with the fulfillment process or the particular items subject to fulfillment.

Similarly, the viewer of the user interface 272 may configure a temporal range over which the visualization region 100 is generated. For example, by engaging a temporal range modification component 312, a series of one or more additional user interface 272 may be rendered to initiate the modification of the temporal range used in generating the visualization region 100. A temporal range may comprise, for example, a start time and an end time over which metrics 112 are generated for the respective stages of the fulfillment process.

Further, the viewer of the user interface 272 may rearrange portions of the visualization region or otherwise may modify the spatial arrangement 239 of the labels 106, the visual identifiers 109, the metrics 112, and/or other components of the visualization region 100 by manipulating a rearrange component 315. It may be beneficial to export the visualization region 100, or the data used in generating the visualization region 100, for use in external applications or services. By manipulating an export component 318, a process may be initiated whereby a series of one or more subsequent user interfaces 272 may be rendered facilitating the export of the visualization region 100 or the data used in generating the visualization region 100 according to one or more predefined formats.

As may be appreciated, the visualization region 100 may be generated in response to a request for a user interface, such as a request for a network page. However, once rendered, the visualization region 100 may be configured to be updated in real-time or near real-time (e.g., updated after a predefined delay) by polling the server for changes in data used to generate the visualization region 100 or by receiving push notifications from the server, wherein the push notifications comprise changes in data used to generate the visualization region 100. This may be accomplished without interfering with the display and/or behavior of the existing user interface 272 by utilizing using Asynchronous JavaScript and Extensible Markup Language (AJAX) or similar technologies.

Turning now to FIG. 3B, shown is another drawing of an example user interface 272b capable of being rendered by a client device 206 (FIG. 2) in the networked environment 200 of FIG. 2 according to various implementations of the present disclosure. In the non-limiting example, of FIG. 3B, a viewer of the user interface 272 may manipulate a portion (e.g., a respective one of the visual identifiers 109) of the visualization region 100 by hovering, touching, gesturing, and/or clicking on the portion using a cursor 321 (FIG. 3B) controlled by an input device.

In the event a user manipulates a respective portion of the visualization region 100, an action may be initiated. For example, in FIG. 3B, a dialog 327 may be rendered in the user interface 272 providing the user with additional information respective of the stage of the visualization region 100 corresponding to the manipulated visual identifier 109. According to various implementations, the dialog 327 may provide the viewer with additional abilities. For example, the user may be able to define, update, or otherwise change metrics 112 for a respective one of the stages of the fulfillment process using a change metric component 330. A reassign component 333, when manipulated, may initiate a series of additional user interfaces 272 facilitating the assignment or reassignment of agents working on a respective stage of the fulfillment process. For example, in the event a stage of the fulfillment process is experiencing an overflow or underflow conditions, the viewer may be able to reduce or increase a number of agents working in the stage of the fulfillment process, thereby resolving the overflow or underflow conditions. Further, the dialog 327 may provide statistics about the manipulated stage of the fulfillment process in the form of a chart 336 or other similar component. A date component 339 may be manipulated by the user to customize the chart 336 according to a user-defined date range in order to view a rate of change of the manipulated stage of the fulfillment process.

Figure 4:
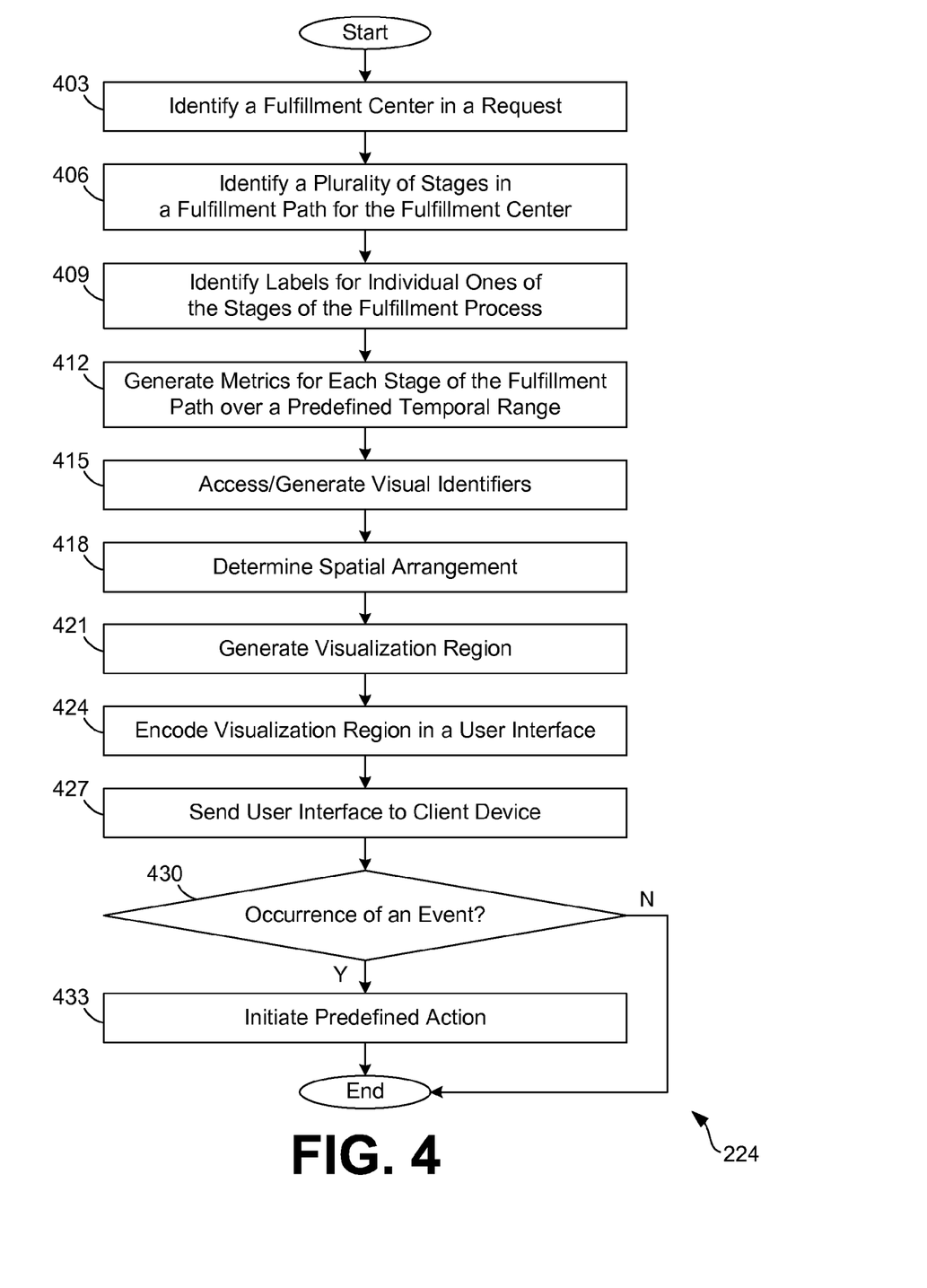
FIG. 4 is a flowchart illustrating one example of functionality implemented as portions of a visualization region generator executed in a computing environment in the networked environment of FIG. 2 according to various implementations of the present disclosure.

Referring next to FIG. 4, shown is a flowchart that provides one example of the operation of a portion of the visualization region generator 224 according to various implementations. It is understood that the flowchart of FIG. 4 provides merely an example of the many different types of functional arrangements that may be employed to implement the operation of the portion of the visualization region generator 224 as described herein. As an alternative, the flowchart of FIG. 4 may be viewed as depicting an example of elements of a method implemented in the computing environment 203 (FIG. 2) according to one or more implementations.

Beginning with box 403, a respective fulfillment center may be identified in a request, for example, for a visualization region for the respective fulfillment center. According to various implementations, a fulfillment center monitoring service 218 may be configured to monitor one or more fulfillment centers. A user interface 272 (FIG. 2) may be generated that enables a user or administrator to access visualization regions corresponding to a respective fulfillment center. In the non-limiting example of FIG. 3A, a user may manipulate a fulfillment center selection component 303 (FIG. 3A) of the user interface 272 to initiate a request for at least one visualization region 100 corresponding to a fulfillment center identified using the fulfillment center selection component 303.

Referring back to FIG. 4, in box 406, a plurality of stages in a fulfillment process may be identified respective of the fulfillment center identified in box 403. As discussed above, a fulfillment process may comprise, for example, the manner in which items purchased over an electronic commerce system 215 are pulled from an inventory storage location, such as a warehouse, and shipped to the shipping address specified by a user conducting the purchase. The stages of the fulfillment process may comprise, for example, quantifiable steps in the fulfillment process. According to various implementations, a fulfillment process may correspond to a particular fulfillment center, wherein the process of pulling items from an inventory storage location and shipping to a shipping address may be unique to the particular fulfillment center.

Next, in box 409, a label 106 may be identified for individual ones of the plurality of stages of the fulfillment process. A label 106 may comprise, for example, an audio or visual representation (e.g., sound, text, image) describing a stage corresponding to the label 106 that may make the corresponding stage readily familiar to a viewer of the visualization region 100.

In box 412, a metric 112 may be determined for individual ones of the plurality of stages of the fulfillment process. As discussed above, a metric 112 may comprise, for example, a number, percentage, and/or any other representation that may represent a measure of a processing state at a particular stage of the fulfillment process. As a non-limiting example, a metric 112 may comprise the number of items classified in a corresponding stage of the fulfillment process, a number of workers assisting in the corresponding stage of the fulfillment process, a percentage of labor assisting in the corresponding stage of the fulfillment process, a staffing level, and/or any other quantifiable measure of a processing state.

Moving on to box 415, a plurality of visual identifiers 109 may be accessed or generated, wherein individual ones of the visual identifiers 109 may be used to represent a particular stage in the fulfillment process. According to one implementation, the plurality of visual identifiers 109 may be accessed from the data store 212 or any other memory. For example, a visual identifier 109 may comprise an image of a shape such as a rectangle, square, octagon, triangle, or any other shape that may vary according to size, and/or color. The image may be accessed from the data store 212 and used in representing a particular stage in the fulfillment process.

According to another implementation, the plurality of visual identifiers 109 may be generated dynamically upon receipt of the request to generate a visualization region 100. For example, a visual identifier 109 may be generated using Adobe® Flash, JS, OpenGL, Microsoft® DirectX, and/or any other graphics generation resource that may generate a graphic or other visual representation for a particular stage in the fulfillment process. For example, a dynamically generated visual identifier 109 may comprise an image of a shape such as a rectangle, square, octagon, triangle, or any other shape that may vary according to a predefined size, and/or color. The image may be stored in the data store 212 and/or used in representing a particular stage in the fulfillment process.

Next, in box 418, a spatial arrangement 239 may be determined for the plurality of visual identifiers 109, wherein respective ones of the visual identifiers 109 correspond to at least one of the plurality of stages. A spatial arrangement 239 may comprise, for example, the size and/or position of the labels 106, the visual identifiers 109, and/or the metrics 112, the size of the visualization region 100, and/or any other data used in generating an appearance of the visualization region 100.

In box 421, the visualization region 100 may be generated, for example, according to the spatial arrangement 239 determined above in box 419. The visualization region 100 may be generated using HTML, CSS, Adobe® Flash, JS, OpenGL, Microsoft® DirectX, and/or any other visual generation resource that may generate a graphic or other visual representation of the visualization region 100. The spatial arrangement 239 may be used to generate the visualization region 100 using the shapes, sizes, and/or positions of the labels 106, the visual identifiers 109, and/or the metrics 112.

In box 424, the visualization region is encoded in a user interface 272 such as a network page 221 or any other user interface 272. According to various implementations, the visualization region 100 may be encoded as a static region of a user interface 272. In other implementations, the visualization region 100 may be encoded as a dynamic region of a user interface 272, capable of updating, refreshing, or otherwise changing upon an occurrence of an event. As a non-limiting example, an event may comprise a manipulation of at least a portion of the visualization region 100 by a viewer of the user interface 272. As illustrated in FIG. 3B, a viewer of a user interface 272 may manipulate a portion (e.g., a respective one of the visual identifiers 109) of the visualization region 100 by hovering, touching, gesturing, and/or clicking on the portion using a cursor 321 (FIG. 3B) controlled by an input device. When a user manipulates the portion of the visualization region 100, a predefined action may be initiated respective of the portion. As illustrated in FIG. 3B, a dialog 327 (FIG. 3B), or any other series of user interfaces 272, may be rendered in the user interface 272 providing the viewer with more information about the stage of the fulfillment process manipulated by the viewer.

In another implementation, an event may comprise a push or poll of data indicating that a metric 112 represented in the visualization region 100, or data used in generating the metric 112, has changed. For example, the fulfillment center monitoring service 218 may periodically monitor the state of a fulfillment process by polling one or more services at predefined frequencies. Similarly, the one or more services may send push notifications to the fulfillment center monitoring service 218, for example, at predefined frequencies or upon a change of the data used in generating the metrics 112 generated in box 412. Accordingly, in box 430, it is determined whether an event has occurred. If an event has occurred, in box 433, a predefined action may be initiated respective to the event.

Figure 5:
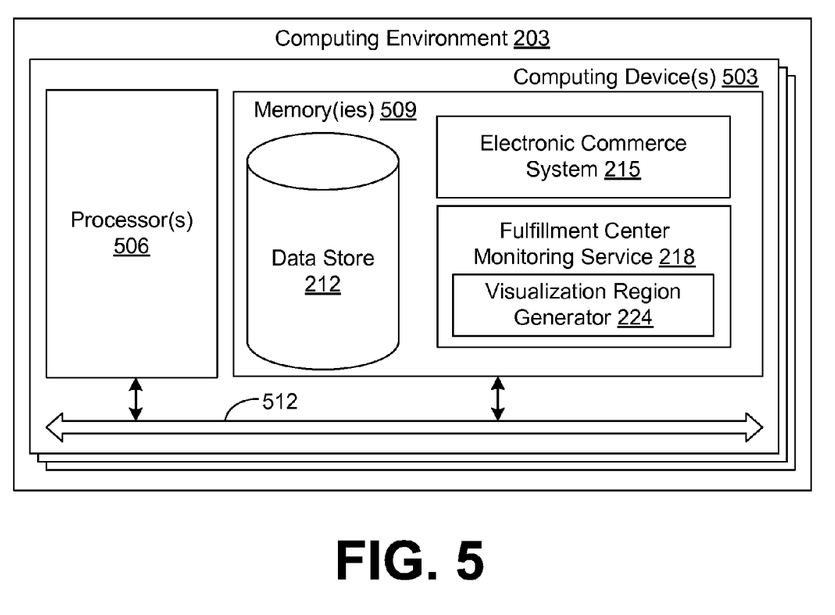
FIG. 5 is a schematic block diagram that provides one example illustration of a computing environment employed in the networked environment of FIG. 2 according to various implementations of the present disclosure.

With reference to FIG. 5, shown is a schematic block diagram of the computing environment 203 according to an implementation of the present disclosure. The computing environment 203 includes one or more computing devices 503. Each computing device 503 includes at least one processor circuit, for example, having a processor 506 and a memory 509, both of which are coupled to a local interface 512. To this end, each computing device 503 may comprise, for example, at least one server computer or like device. The local interface 512 may comprise, for example, a data bus with an accompanying address/control bus or other bus structure as can be appreciated.

Stored in the memory 509 are both data and several components that are executable by the processor 506. In particular, stored in the memory 509 and executable by the processor 506 are the electronic commerce system 215, the fulfillment center monitoring service 218, and the visualization region generator 224, and potentially other applications. Also stored in the memory 509 may be a data store 212 and other data. In addition, an operating system may be stored in the memory 509 and executable by the processor 506.

It is understood that there may be other applications that are stored in the memory 509 and are executable by the processor 506 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 509 and are executable by the processor 506. In this respect, the term "executable" means a program file that is in a form that can ultimately be run by the processor 506. Examples of executable programs may be, for example, a compiled program that can be translated into machine code in a format that can be loaded into a random access portion of the memory 509 and run by the processor 506, source code that may be expressed in proper format such as object code that is capable of being loaded into a random access portion of the memory 509 and executed by the processor 506, or source code that may be interpreted by another executable program to generate instructions in a random access portion of the memory 509 to be executed by the processor 506, etc. An executable program may be stored in any portion or component of the memory 509 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 509 is defined herein as including both volatile and nonvolatile memory and data storage components. Volatile components are those that do not retain data values upon loss of power. Nonvolatile components are those that retain data upon a loss of power. Thus, the memory 509 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 506 may represent multiple processors 506 and/or multiple processor cores and the memory 509 may represent multiple memories 509 that operate in parallel processing circuits, respectively. In such a case, the local interface 512 may be an appropriate network that facilitates communication between any two of the multiple processors 506, between any processor 506 and any of the memories 509, or between any two of the memories 509, etc. The local interface 512 may comprise additional systems designed to coordinate this communication, including, for example, performing load balancing. The processor 506 may be of electrical or of some other available construction.

Although the electronic commerce system 215, the fulfillment center monitoring service 218, and the visualization region generator 224, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of, or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 4 shows the functionality and operation of an implementation of portions of the visualization region generator 224. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 506 in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some implementations, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce system 215, the fulfillment center monitoring service 218, and the visualization region generator 224, that comprises software or code can be embodied in any non-transitory computer-readable medium for use by or in connection with an instruction execution system such as, for example, a processor 506 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the electronic commerce system 215, the fulfillment center monitoring service 218, and the visualization region generator 224, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 503, or in multiple computing devices in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

It should be emphasized that the above-described implementations of the present disclosure are merely possible examples of implementations set forth for a clear understanding of the principles of the disclosure. Many variations and modifications may be made to the above-described implementation(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying program code executable in at least one computing device that, when executed, causes the at least one computing device to improve performance of a fulfillment process by programmatically generating a graphical representation of a state of a fulfillment center by:

receiving a selection of the fulfillment center among a plurality of potential fulfillment centers, individual ones of the plurality of potential fulfillment centers having a different fulfillment process;

identifying a plurality of stages in a fulfillment process identified from memory for the fulfillment center, the plurality of stages describing a progression of an item in item fulfillment;

generating a metric for individual ones of the plurality of stages of the fulfillment process respective of a temporal range, the metric describing a processing state for the individual ones of the plurality of stages;

determining a spatial arrangement for a plurality of visual identifiers for inclusion in a visualization, the spatial arrangement determined based at least on the progression of the item in item fulfillment, wherein individual ones of the visual identifiers in the spatial arrangement correspond to one of the plurality of stages, the individual ones of the visual identifiers being configured to show the metric generated in association with a label describing a corresponding one of the plurality of stages;

generating user interface data that causes the visualization to be shown in a region of a user interface in accordance with the spatial arrangement determined, wherein the region comprises the plurality of visual identifiers, at least one of the plurality of visual identifiers comprising a component indicating that a rate of change of the metric respective of the temporal range is positive or negative; and sending the user interface data to a client device over a network for rendering the visualization in a display.

2. The non-transitory computer-readable medium of claim 1, wherein the metric generated for the individual ones of the plurality of stages of the fulfillment process describes a number of items in the corresponding one of the plurality of stages.

3. The non-transitory computer-readable medium of claim 1, wherein the metric generated for the individual ones of the plurality of stages of the fulfillment process describes a number of workers assisting in the corresponding one of the plurality of stages.

4. A system for improving performance of a fulfillment process by programmatically generating a graphical representation of a state of a fulfillment center, comprising:

at least one computing device; and program instructions executable in the at least one computing device that, when executed, cause the at least one computing device to:

identify a plurality of stages in the fulfillment process for the fulfillment center;

generate a metric for individual ones of the plurality of stages of the fulfillment process;

determine a spatial arrangement for a plurality of visual identifiers for inclusion in a visualization, the spatial arrangement determined based at least on a progression of an item in item fulfillment, wherein individual ones of the visual identifiers in the spatial arrangement correspond to at least one of the plurality of stages, individual ones of the visual identifiers being configured to show the metric generated for the individual ones of the plurality of stages; and generate a visualization region for inclusion in a user interface as specified by the spatial arrangement, wherein the visualization region comprises at least a portion of the plurality of visual identifiers.

5. The system of claim 4, further comprising program instructions that, when executed, cause the at least one computing device to send the visualization region to a client device over a network for rendering in a display.

6. The system of claim 5, further comprising program instructions that, when executed, cause the at least one computing device to encode the visualization region in user interface data that causes additional information pertaining to one of the plurality of stages of the fulfillment process to be shown in a portion of the visualization region in response to a manipulation of the portion of the visualization region being performed on the client device.

7. The system of claim 5, further comprising program instructions that, when executed, cause the at least one computing device to generate a subsequent visualization region in response to a rearrangement of the spatial arrangement performed on the client device.

8. The system of claim 4, wherein at least one of the plurality of visual identifiers comprises a component indicating that a rate of change of the metric over a predefined temporal range has satisfied threshold.

9. The system of claim 4, further comprising program instructions that, when executed, cause the at least one computing device to generate a label for the individual ones of the plurality of stages.

10. The system of claim 9, wherein individual ones of the identifiers comprise the label generated for the individual ones of the plurality of stages.

11. The system of claim 4, wherein the metric generated for the individual ones of the plurality of stages of the fulfillment process describes a number of items in a corresponding one of the plurality of stages.

12. The system of claim 4, wherein the metric generated for the individual ones of the plurality of stages of the fulfillment process describes a number of workers assisting in a corresponding one of the plurality of stages.

13. The system of claim 4, wherein the metric is generated for a temporal range.

14. A computer-implemented method for improving performance of a fulfillment process by programmatically generating a graphical representation of a state of a fulfillment center, comprising:

identifying, by at least one computing device, a plurality of stages in a fulfillment process for a fulfillment center in response to a request to generate a visualization region visualizing a state of the fulfillment center;

generating, by the at least one computing device, a metric for individual ones of the plurality of stages of the fulfillment process respective of a temporal range;

determining, by the at least one computing device, a spatial arrangement for a plurality of visual identifiers for inclusion in a visualization, the spatial arrangement determined based at least on a progression of an item in item fulfillment, wherein individual ones of the visual identifiers in the spatial arrangement correspond to at least one of the plurality of stages, the individual ones of the visual identifiers being configured to show the metric generated for the individual ones of the plurality of stages;

generating, by the at least one computing device, the visualization region according to the spatial arrangement, wherein the visualization region comprises at least a portion of the plurality of visual identifiers; and encoding, by the at least one computing device, the visualization region in a user interface.

15. The computer-implemented method of claim 14, further comprising generating, by the at least one computing device, a label for individual ones of the plurality of stages that identifies the individual ones of the plurality of stages.

16. The computer-implemented method of claim 14, further comprising sending, by the at least one computing device, the visualization region to a client device over a network for rendering in a display.

17. The computer-implemented method of claim 16, further comprising encoding, by the at least one computing device, the visualization region in user interface data that causes a rendering of additional information pertaining to one of the plurality of stages of the fulfillment process to be shown in a portion of the visualization region in response to a manipulation of the portion of the visualization region being performed on the client device.

18. The computer-implemented method of claim 16, further comprising generating, by the at least one computing device, a subsequent visualization region in response to a rearrangement of the spatial arrangement initiated by a user via the client device.

19. The computer-implemented method of claim 14, wherein at least one of the plurality of visual identifiers comprises a component indicating that a rate of change of the metric over the temporal range has satisfied a threshold.

20. The computer-implemented method of claim 14, wherein the metric generated for the individual ones of the plurality of stages of the fulfillment process describes a number of items in the corresponding one of the plurality of stages.

\* \* \* \* \*